United States Patent
Xiao et al.

(10) Patent No.: US 7,784,165 B2
(45) Date of Patent: Aug. 31, 2010

(54) METHOD OF FORMING A PANEL CONSTRAINED LAYER DAMPER TREATMENT

(75) Inventors: Hong Xiao, Farmington Hills, MI (US); Richard Swanson, Frankfort, IL (US)

(73) Assignee: Material Science Corporation, Elk Grove, IL (US)

( * ) Notice: Subject to any disclaimer, the term of this patent is extended or adjusted under 35 U.S.C. 154(b) by 946 days.

(21) Appl. No.: 11/379,253

(22) Filed: Apr. 19, 2006

(65) Prior Publication Data

US 2007/0246296 A1    Oct. 25, 2007

(51) Int. Cl.
B23P 11/00 (2006.01)
B23P 17/00 (2006.01)
E04B 1/82 (2006.01)

(52) U.S. Cl. ............... 29/447; 29/469.5; 29/525.14; 219/86.1; 181/290; 181/296

(58) Field of Classification Search ............ 29/447, 29/469.5, 525.14; 228/227, 2.1, 112.1; 219/86.1, 219/78.01; 181/290, 296
See application file for complete search history.

(56) References Cited

U.S. PATENT DOCUMENTS

| | | | | |
|---|---|---|---|---|
| 3,658,635 A | * | 4/1972 | Eustice | 428/425.8 |
| 3,878,018 A | * | 4/1975 | Cospen et al. | 156/267 |
| 4,073,671 A | * | 2/1978 | Licata | 156/219 |
| 4,399,174 A | * | 8/1983 | Tanaka et al. | 428/67 |
| 5,111,579 A | * | 5/1992 | Andersen | 29/897.32 |
| 5,271,142 A | * | 12/1993 | Moore et al. | 29/469.5 |
| 5,288,356 A | * | 2/1994 | Benefiel | 156/196 |
| 5,416,962 A | * | 5/1995 | Passarella | 29/896.91 |
| 5,463,804 A | * | 11/1995 | McCleary et al. | 29/469.5 |
| 5,695,867 A | * | 12/1997 | Saitoh et al. | 428/219 |
| 6,550,124 B2 | * | 4/2003 | Krajewski et al. | 29/423 |
| 7,100,259 B2 | * | 9/2006 | Morales et al. | 29/421.1 |
| 7,392,929 B1 | * | 7/2008 | Finerman et al. | 228/122.1 |
| 2004/0018353 A1 | * | 1/2004 | Czaplicki et al. | 428/304.4 |

* cited by examiner

*Primary Examiner*—Jermie E Cozart
(74) *Attorney, Agent, or Firm*—Quinn Law Group, PLLC

(57) ABSTRACT

A method of forming a panel constrained layer damper treatment from a laminate, having a panel and a visco-elastic layer attached thereto, by forming a panel constrained layer damper from the laminate to a predetermined shape is provided. Additionally, the method of the present invention includes attaching the panel constrained layer damper to a substrate to form the panel constrained layer damper treatment. The method may also include subjecting the panel constrained layer damper to heat energy to bond the visco-elastic layer to the substrate. In addition, various methods of attaching the panel constrained layer damper to the substrate are provided.

22 Claims, 2 Drawing Sheets

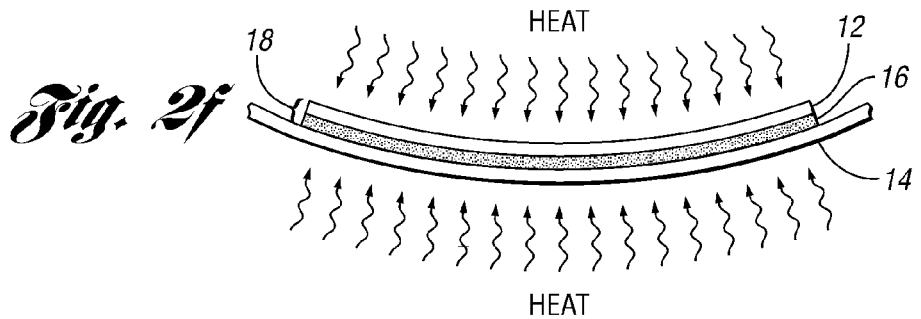
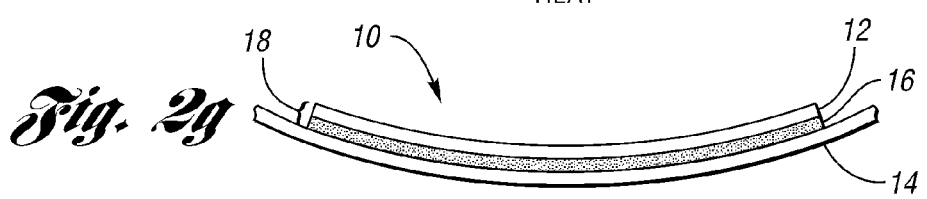
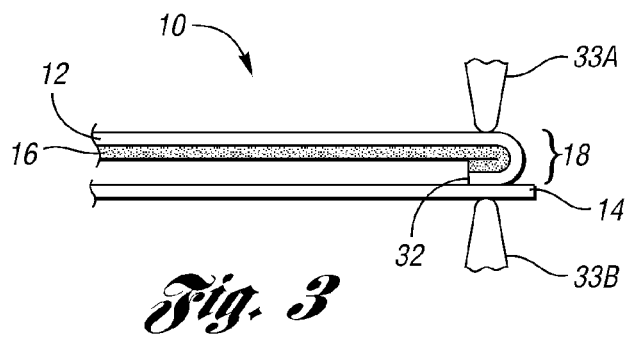
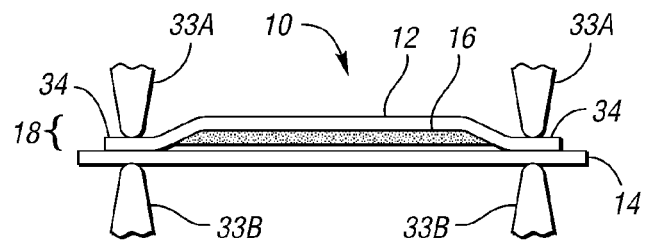
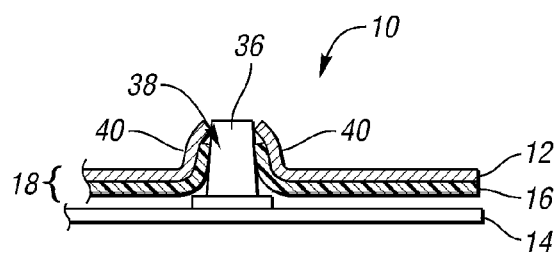
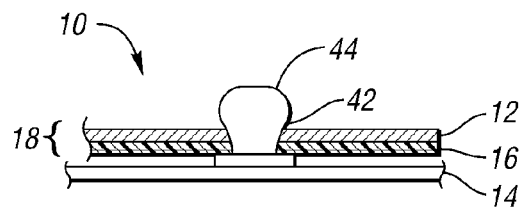

US 7,784,165 B2

METHOD OF FORMING A PANEL CONSTRAINED LAYER DAMPER TREATMENT

TECHNICAL FIELD

The present invention relates to a method of making a panel constrained layer damper treatment for sound and vibration attenuation.

BACKGROUND OF THE INVENTION

Manufacturers, such as automobile manufacturers, have recently refocused efforts to reduce or attenuate the noise and vibration of their products. Because of these efforts, many treatments have been devised for the various panels. Traditional means for quieting panels would include mastics, spray-on deadeners, etc. Each of these systems has its shortcomings.

Mastics are asphaltic patches, which are attached to metal surfaces and hardened during a heat-elevated painting process. Heat activated mastics are also used for damping resonances. Disadvantages of mastics include: build variations due to manual placement; airborne paint contamination resulting in paint quality issues; labor required for installation; inconsistent melt characteristics; non recyclability; susceptibility to damage during installation; packaging limitations due to thickness of mastics; providing only localized damping; and assembly line space requirements.

Spray-on deadeners are sprayed treatments that are typically applied via a robot or manually to panel. Spray-on deadeners provide a noise control barrier. Disadvantages of spray-on deadeners include: masking requirement for spray applications; non-recyclability; process limited by overspray and dripping; robot requirement for application; assembly line space requirement; on-going maintenance of robots; and only localized damping coverage.

Because of the limitations of the above-mentioned treatments, designers and engineers have begun to use panel constrained layer damper treatments for noise and vibration attenuation, especially to diminish the propagation of structural noise and the transmission of airborne noise. The panel constrained layer damper treatment provides both high damping effectiveness and structurally rigidity, therefore is a preferred method of damping both airborne and structural borne vibrations. The panel constrained layer damper includes a panel having a visco-elastic layer attached thereto. The prior art panel constrained layer dampers are formed by stamping the panel and die-cutting the visco-elastic layer to match the dimensions of the panel. The visco-elastic layer is then attached to the panel by various methods such as, for example, tabs or heat staking to form a panel constraining layer damper, or PCL damper. The formation of the PCL damper has traditionally been labor intensive and the visco-elastic layer may inadvertently become separated from the panel if not properly secured. The PCL damper is subsequently attached to a substrate, such as an automotive body panel, to form the panel constrained layer damper treatment.

SUMMARY OF THE INVENTION

A method of producing a panel constrained layer damper treatment of a predetermined shape is provided. The method includes forming a laminate having a panel and an attached visco-elastic layer. Subsequently, the laminate is formed to the predetermined shape as a panel constrained layer damper. The panel constrained layer damper is then attached to a substrate at least portions of which are the predetermined shape and the panel constrained layer damper and the substrate are subjected to heat energy to form the panel constrained layer damper treatment. The heat energy operates to bond the visco-elastic layer to the substrate.

The visco-elastic layer may be expandable in the presence of heat energy. The forming of the panel constrained layer damper may include at least one stamping operation.

A method of attaching the panel constrained layer damper to the substrate may include forming at least one tab from the panel constrained layer damper such that the panel and the substrate are in direct contact to enable spot welding and subsequently spot welding the panel and substrate to each other. Alternately, the visco-elastic layer may be sufficiently offset from the panel to permit the panel and substrate to be in a weldable relationship to each other. The panel constrained layer damper may then be attached to the substrate by welding the panel and substrate to each other.

Mechanical methods of attaching the panel constrained layer damper to the substrate may include affixing at least one post to the substrate and forming at least one bore in the panel constrained layer damper. The bore includes at least one inwardly projecting finger. Subsequently, the panel constrained layer damper is joined with the substrate such that the post passes through a respective bore to enable the at least one inwardly projecting finger to frictionally engage the post. Alternately, the panel constrained layer damper may be attached to the substrate by forming at least one bore in the panel constrained layer damper and affixing at least one knob to the substrate. The knob is sufficiently configured to be passable through a respective bore and to substantially resist removal from the at least one bore. Subsequently, the panel constrained layer damper is joined with the substrate by passing the knob through a respective bore.

The above features and other features and advantages of the present invention are readily apparent from the following description of the best mode for carrying out the invention when taken in connection with the accompanying drawings.

BRIEF DESCRIPTION OF THE DRAWINGS

FIG. 2f illustrates the heating of the PCL damper and the substrate to form the panel constrained layer damper treatment of FIG. 1;

FIG. 2g illustrates the panel constrained layer damper treatment, of FIG. 1, produced by the steps illustrated by FIGS. 2ai f, FIG. 3 illustrates a "folded tab" method of attaching the PCL damper to the substrate;

FIG. 4 illustrates a "center laminate" method of attaching the PCL damper to the substrate;

FIG. 5 illustrates a "post/spring hole" method of attaching the PCL damper to the substrate; and FIG. 6 illustrates a "knob and bore" method of attaching the PCL damper to the substrate.

DETAILED DESCRIPTION OF THE PREFERRED EMBODIMENTS

Figure 1:
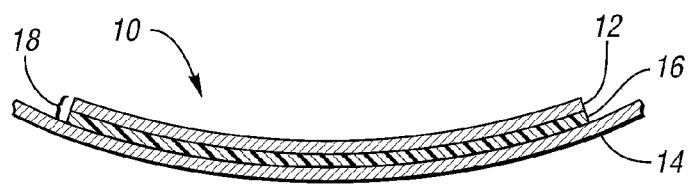
FIG. 1 is a schematic cross sectional view of a panel constrained layer damper treatment formed by the method of the present invention comprising a visco-elastic layer disposed between a panel and a substrate.

Referring to the drawings wherein like reference numbers correspond to like or similar components throughout the several figures, there is shown in FIG. 1 a panel constrained layer damper treatment 10 of the present invention, formed by a method consistent with the present invention. The panel constrained layer damper treatment 10 includes a constraining layer or panel 12 and a substrate 14, respectively, having an engineered visco-elastic layer 16 therebetween and spanning substantially the entirety of the panel 12 and the substrate 14.

The visco-elastic layer 16 may be formed from any suitable visco-elastic material, which serves a noise and vibration damping function. Those skilled in the art will recognize that the visco-elastic layer 16 may also serve an adhesive attachment function between the panel 12 and the substrate 14. Alternately, those skilled in the art will recognize that the visco-elastic layer 16 may be bonded to the panel 12 and substrate 14 using adhesives known in the art. The panel 12 and substrate 14 may be formed from any material with the requisite stiffness to provide support to the visco-elastic layer 16, such as plastics, aluminum, magnesium, titanium, and steel. In the preferred embodiment the material for the panel 12 and substrate 14 is steel. An electro-galvanized coating may be provided on the steel panel 12 and the substrate 14 for corrosion resistance. The panel 12 and substrate 14 may be formed from a material having the same thickness and composition, however, they need not be.

An exemplary panel constrained layer damper treatment 10 may have a panel 12 formed from steel and having a thickness of approximately 0.5 millimeters, or mm. Additionally, the visco-elastic layer 16 may have a thickness between approximately 1 mm and approximately 2 mm. Further, the substrate 14 may be formed from steel having a thickness between approximately 0.7 mm and approximately 1 mm. Thusly, the panel constrained layer damper treatment 10 will have not only high damping performance, but also high stiffness characteristics. This type of panel constrained layer damper treatment 10 can be used in the automotive industry as a "dash doubler panel", "wheel house doubler", etc.

The panel 12 and the visco-elastic layer 16 together constitute a panel constrained layer damper, or PCL damper 18. The substrate 14 is typically a panel, such as a curved or formed steel automotive panel, which the PCL damper 18 serves to damp.

Figure 2A:
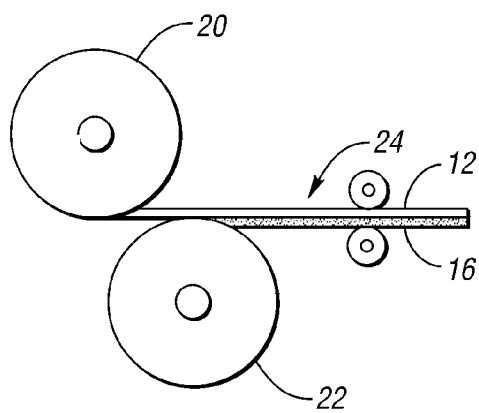
FIG. 2a illustrates a method of producing a laminate, which includes the panel having the visco-elastic layer affixed thereto for use in forming a panel constrained layer damper, or PCL damper.
Figure 2B:
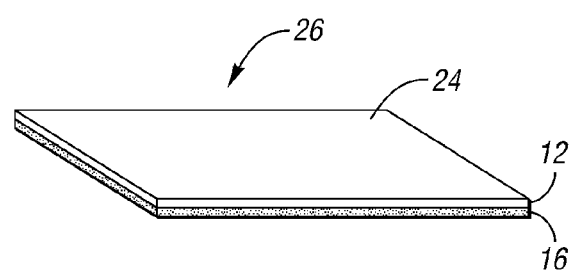
FIG. 2b illustrates the laminate formed by the method illustrated in FIG. 2a in sheet form.
Figure 2C:
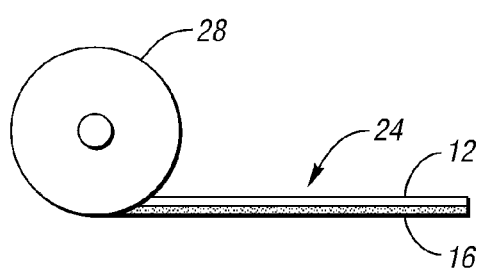
FIG. 2c illustrates the laminate formed by the method illustrated in FIG. 2a in coil form.

FIGS. 2a through 2f illustrate a method, consistent with the present invention, of forming the panel constrained layer damper treatment 10, shown in FIG. 1. Referring to FIG. 2a there is shown a first coil 20 of enrolled or coiled material of sufficient characteristics or properties to form the panel 12 and a second coil 22 of enrolled or coiled material of sufficient characteristics or properties to form the visco-elastic layer 16. The material from the first and second coils 20 and 22 are laminated to one another using either adhesives known in the art or through the introduction of heat to form a laminate 24 consisting of the panel 12 and the visco-elastic layer 16. In FIG. 2b there is shown the laminate 24, shown in FIG. 2a, in the form of a sheet 26. Alternately, FIG. 2c shows the laminate 24 in the form of a coil 28. Whether the laminate 24 is provided in the form of a sheet 26 or a coil 28 is dependent on the manufacturing process for making the PCL damper 18.

Figure 2D:
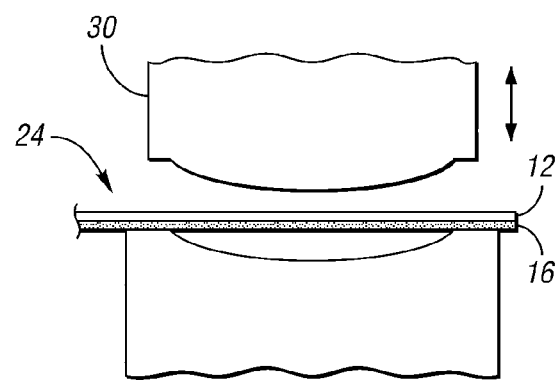
FIG. 2d illustrates a method of forming the PCL damper to a predetermined shape from the laminate shown in FIGS. 2a, 2b, and 2c.

Referring to FIG. 2d, there is shown a press 30, which operates to form the PCL damper 18 from the laminate 24. This stamping or forming operation forms the PCL damper 18 into a predetermined shape for attachment to the substrate 14, already having a complementary predetermined shape. Those skilled in the art will recognize that the PCL damper 18 may be formed from the laminate 24 by various other means such a die cutting, laser cutting, sawing, etc. while remaining within the scope of that which is claimed. By forming the PCL damper 18 from the laminate 24, the traditional steps of forming the panel 12 and subsequently cutting the visco-elastic layer 16 to fit the panel 12 and attaching thereto are reduced to the single forming step shown in FIG. 2d. Additionally, the likelihood that the visco-elastic layer 16 will inadvertently fall from the panel 12 during handling of the PCL damper 18 is reduced.

Figure 2E:
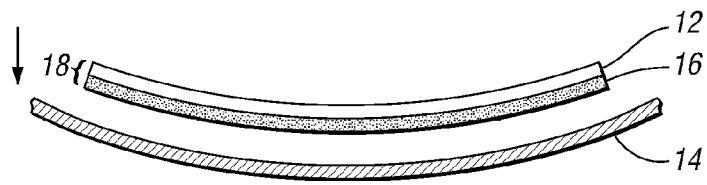
FIG. 2e illustrates the attachment of the PCL damper to a substrate having the predetermined shape.

Referring now to FIG. 2e there is shown the PCL damper 18 being attached to the substrate 14. In this step, the panel 12 and the substrate 14 are attached to each other using fastening techniques to be described in greater detail hereinafter with reference to FIGS. 3 through 6.

Subsequent to attaching the panel 12 and the substrate 14, the PCL damper 18 and the substrate 14 are subjected to heat energy, as shown in FIG. 2f. The heat energy will cause the visco-elastic layer 16 to melt and/or expand thereby bonding the visco-elastic layer 16 to the substrate 14 to form the panel constrained layer damper treatment 10, which is shown in FIG. 2g.

The preferred methods of attaching the panel 12, and therefore the PCL damper 18, to the substrate 14, as shown in FIG. 2e, are shown in FIGS. 3 through 6. FIGS. 3 and 4 show a method of attachment by spot welding. Since the panel 12 and the substrate 14 must be in direct or metal-to-metal contact to enable spot welding, measures must be taken to ensure that the visco-elastic layer 16 does not impede this metal-to-metal contact. FIG. 3 illustrates a "folded tab" attachment method. With the "folded tab" attachment method, the PCL damper 18 is formed during the forming step, shown in FIG. 2d, with the edge of the PCL damper 18 having a tab 32 formed thereon. The tab 32 allows the panel 12 of the PCL damper 18 to directly contact the substrate 14 thereby enabling spot welding. A respective one of a pair of spot welding electrodes 33A and 33B are applied to the panel 12 and the substrate 14. When current is applied to the spot welding electrodes 33A and 33B, a weldment is created between the PCL damper 18 and the substrate 14.

Yet another method of attaching the PCL damper 18 to the substrate 14 by spot welding is termed the "center laminate" method and is shown in FIG. 4. In FIG. 4, there is shown the PCL damper 18 formed from the laminate 24, shown in FIGS. 2a, 2b, and 2c, where the visco-elastic layer 16 is offset and does not extend the entire width of the panel 12, that is the visco-elastic layer 16 is disposed generally along the center of the laminate 24. Flanges 34 are formed on the edge of the PCL damper 18 during the forming process shown in FIG. 2d. The flanges 34 allow metal-to-metal contact between the panel 12 and the substrate 14, thereby enabling spot welding. In a similar fashion to that shown in FIG. 3, the respective one of a pair of spot welding electrodes 33A and 33B are applied to the panel 12 and the substrate 14. When current is applied to the spot welding electrodes 33A and 33B, a weldment is created between the PCL damper 18 and the substrate 14. The method of attachment shown in FIG. 4 may be used for panel constrained layer damper treatments 10 that require a simple PCL damper 18 geometry such as, for example, a rectangle.

Additional methods of attachment are illustrated in FIGS. 5 and 6. The methods of attaching the PCL damper 18 to the substrate 14 shown in FIGS. 5 and 6 are purely mechanical methods. FIG. 5 illustrates a "post/spring hole" method of attachment. With this method, a stud or post 36 is welded or otherwise affixed to the substrate 14. A "spring hole" or bore 38 is defined by the PCL damper 18 and is preferably formed during the forming step shown in FIG. 2*d*. The bore 38 has a plurality of inwardly projecting fingers 40 that operate to frictionally engage the post 36 as the PCL damper 18 and the substrate 14 are joined during the assembly step, shown in FIG. 2*e*.

FIG. 6 illustrates a "knob and hole" attachment method. For this method, the PCL damper 18 defines a generally cylindrical bore 42. The bore 42 is preferably formed during the PCL damper 18 forming step shown in FIG. 2*d*. Additionally a protuberance or knob 44 is welded or otherwise affixed to the substrate 14. The knob 44 is sufficiently configured to pass through the bore 42 and resist removal from the bore 42, thereby securing the PCL damper 18 with respect to the substrate 14 during the assembly step shown in FIG. 2*e*.

By forming the PCL damper 18 from the laminate 24, the additional steps of cutting the visco-elastic layer 16 and subsequently attaching the visco-elastic layer 16 to the panel 12 is eliminated. Furthermore, the chance that the visco-elastic layer 16 will inadvertently fall from the panel 12 prior to attachment of the PCL damper 18 to the substrate 14 is greatly reduced.

While the best modes for carrying out the invention have been described in detail, those familiar with the art to which this invention relates will recognize various alternatives designs and embodiments for parts in the invention or from the scope of the appended claims.

The invention claimed is:

1. A Method of producing a panel constrained layer damper treatment comprising:
    forming a laminate having a panel and an attached visco-elastic layer;
    forming said laminate to a curved shape as a panel constrained layer damper; and
    attaching said panel constrained layer damper to a substrate having at least portions which are the curved shape to form the panel constrained layer damper treatment;
    wherein said curved shape of the substrate is complementary to said curved shape of the panel constrained layer damper; and
    wherein said visco-elastic layer spans substantially the entirety of said panel and said substrate.

2. The Method of claim 1, further comprising subjecting the panel constrained layer damper to heat energy to bond said visco-elastic layer to said substrate.

3. The Method of claim 1, wherein forming said panel constrained layer damper includes at least one stamping operation.

4. The Method of claim 1, wherein said laminate is formed in one of a sheet form and coil form.

5. The Method of claim 1, wherein said visco-elastic layer is expandable in the presence of heat energy.

6. The Method of claim 1, wherein attaching said panel constrained layer damper to said substrate includes:
    forming at least one tab from said panel constrained layer damper such that said panel and said substrate are in direct contact to enable spot welding; and
    spot welding said panel and said substrate to each other.

7. The Method of claim 1, wherein said visco-elastic layer is sufficiently offset from said panel to permit said panel and said substrate to be in a weldable relationship to each other, and wherein said attaching said panel constrained layer damper to said substrate includes:
    welding said panel and said substrate to each other.

8. The Method of claim 1, wherein attaching said panel constrained layer damper to said substrate includes:
    affixing at least one post to said substrate;
    forming at least one bore in said panel constrained layer damper, said at least one bore having at least one inwardly projecting finger; and
    joining said panel constrained layer damper with said substrate such that said at least one post passes through said at least one bore to enable said at least one inwardly projecting finger to frictionally engage said post.

9. The Method of claim 1, wherein attaching said panel constrained layer damper to said substrate includes:
    forming at least one bore in said panel constrained layer damper;
    affixing at least one knob to said substrate, said at least one knob being sufficiently configured to be passable through said at least one bore and substantially resistant to removal from said at least one bore; and
    joining said panel constrained layer damper with said substrate by passing said at least one knob through said at least one bore.

10. The method of claim 1, wherein forming said panel constrained layer damper includes at least one pressing operation.

11. A Method of producing a panel constrained layer damper treatment from a laminate having a panel and a visco-elastic layer spanning substantially the entirety of the panel attached thereto, the method comprising:
    forming a panel constrained layer damper from the laminate to a curved shape;
    attaching said panel constrained layer damper to a substrate having said curved shape to form the panel constrained layer damper treatment;
    wherein said curved shape of said substrate is complementary to said curved shape of said panel constrained damper layer; and
    wherein the visco-elastic layer spans substantially the entirety of said substrate.

12. The Method of claim 11, further comprising heating the panel constrained layer damper to sufficiently bond the visco-elastic layer to said substrate.

13. The Method of claim 11, wherein forming said panel constrained layer damper includes at least one stamping operation.

14. The Method of claim 11, wherein the laminate is provided in one of a sheet form and coil form.

15. The Method of claim 11, wherein the visco-elastic layer is expandable in the presence of heat energy.

16. The Method of claim 11, wherein attaching said panel constrained layer damper to said substrate includes:
    forming at least one tab from said panel constrained layer damper such that the panel and said substrate are in sufficiently direct contact to enable spot welding; and
    spot welding the panel to said substrate.

17. The Method of claim 11, wherein attaching said panel constrained layer damper to said substrate includes:
    affixing at least one post to said substrate;
    forming at least one bore in said panel constrained layer damper, said at least one bore having at least one inwardly projecting finger; and
    joining said panel constrained layer damper with said substrate such that said at least one post passes through said at least one bore to enable said at least one inwardly projecting finger to frictionally engage said post.

18. The Method of claim 11, wherein attaching said panel constrained layer damper to said substrate includes:
   forming at least one bore in said panel constrained layer damper;
   affixing at least one knob to said substrate, said at least one knob being sufficiently configured to be passable through said at least one bore and substantially resistant to removal from said at least one bore; and
   joining said panel constrained layer damper with said substrate by passing said at least one knob through said at least one bore.

19. The method of claim 11, wherein forming said panel constrained layer damper includes at least one pressing operation.

20. A Method of producing a panel constrained layer damper treatment comprising:
   providing a laminate having a panel and a visco-elastic layer attached thereto;
   stamping a panel constrained layer damper from said laminate to form said panel constrained layer damper into a curved shape; and
   attaching said panel constrained layer damper to a substrate having said curved shape to form the panel constrained layer damper treatment; and
   subjecting the panel constrained layer damper to heat energy to bond said visco-elastic layer to said substrate; and
   wherein said curved shape of said substrate is complementary to said curved shape of said panel constrained layer damper.

21. The Method of claim 20, wherein said visco-elastic layer is expandable in the presence of heat energy.

22. The method of claim 20, wherein forming said panel constrained layer damper includes at least one pressing operation.

* * * * *